United States Patent
Alacoque

(10) Patent No.: US 8,873,847 B2
(45) Date of Patent: Oct. 28, 2014

(54) METHOD OF DEMOSAICING A DIGITAL RAW IMAGE, CORRESPONDING COMPUTER PROGRAM AND GRAPHICS OR IMAGER CIRCUIT

(75) Inventor: Laurent Alacoque, Voreppe (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 320 days.

(21) Appl. No.: 13/224,828

(22) Filed: Sep. 2, 2011

(65) Prior Publication Data

US 2012/0063682 A1 Mar. 15, 2012

(30) Foreign Application Priority Data

Sep. 6, 2010 (FR) ...................................... 10 57074

(51) Int. Cl.
*G06K 9/00* (2006.01)
*G06T 3/40* (2006.01)

(52) U.S. Cl.
CPC .................................... *G06T 3/4015* (2013.01)
USPC .......................................................... 382/167

(58) Field of Classification Search
USPC .......... 382/162, 167, 240, 263, 264, 278, 279
See application file for complete search history.

(56) References Cited

U.S. PATENT DOCUMENTS

| 5,506,619 A * | 4/1996 | Adams et al. .................. 348/272 |
| 2010/0092082 A1* | 4/2010 | Hirakawa et al. ............. 382/167 |

OTHER PUBLICATIONS

French Preliminary Search Report issued Apr. 6, 2011, in French 10 57074, filed Sep. 6, 2010 (with English Translation of Category of Cited Documents).

Li Chen, et al., "Color Filter Array Demosaicking Using Wavelet-Based Subband Synthesis", Image Processing 2005, ICIP 2005, 4 Pages.

J. Driesen, et al., "Wavelet-based Color Filter Array demosaicking", International Conference on Image Processing, Oct. 2004, 4 Pages.

Markus Beermann, et al., "Improved Demosaicking in the Frequency Domain by Restoration Filtering of the LCC Bands" Visual Communications and Image Processing 2008, Jan. 2008, 10 Pages.

Takashi Komatsu, et al., "Sharpening-demosaicing with the shift-invariant Haar wavelet transform", Communication Systems, Jan. 2009, 4 Pages.

Raymond H. Chan, et al., "Wavelet Algorithms for High-Resolution Image Reconstruction," Siam Journal on Scientific Computing, vol. 24, No. 4, Jan. 2002, 24 Pages.

Takahiro Saito, et al., "Sharpening-demosaicing method with a total-variation-based super-resolution technique", Proceedings of the SPIE, vol. 5678, Jan. 2005, 12 Pages.

* cited by examiner

*Primary Examiner* — Phuoc Tran
(74) *Attorney, Agent, or Firm* — Oblon, Spivak, McClelland, Maier & Neustadt, L.L.P.

(57) ABSTRACT

A method of demosaicing a digital raw image in the form of a matrix of pixels, each dedicated to a single color among several predetermined colors from color filters, includes obtaining a color digital image of the same resolution as the raw image and in which each pixel results from corresponding pixels in a luminance image and in chrominance images reconstructed from the raw image, transformation of the raw image by applying local convolution kernels to its pixels, taking into account neighboring pixels of different colors, to obtain an image of low frequency coefficients using a low frequency local kernel and images of high frequency coefficients using high frequency local kernels; reconstruction of the luminance image using at least the image of low frequency coefficients; reconstruction of the chrominance images using the images of high frequency coefficients.

17 Claims, 5 Drawing Sheets

Figure 1:
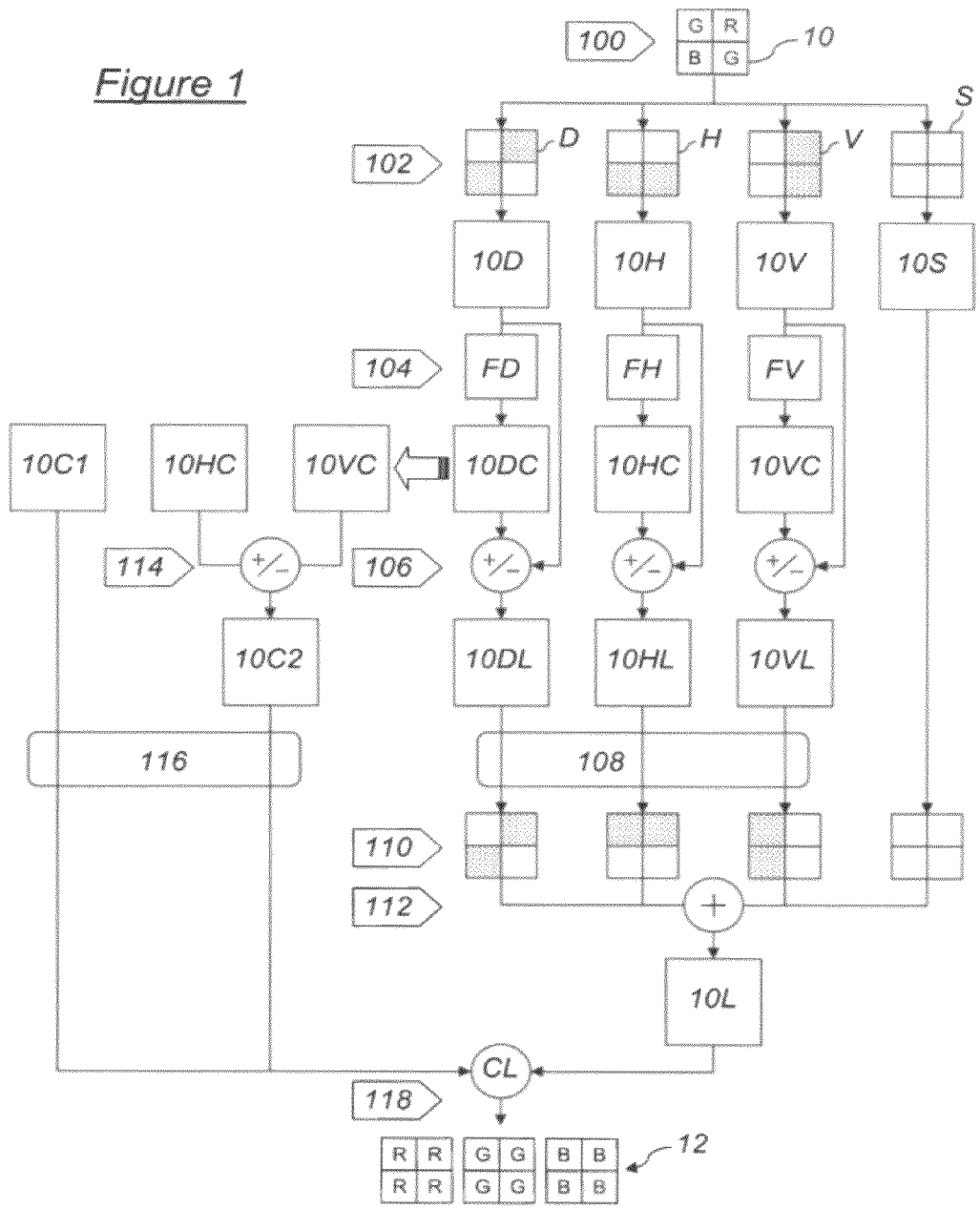

METHOD OF DEMOSAICING A DIGITAL RAW IMAGE, CORRESPONDING COMPUTER PROGRAM AND GRAPHICS OR IMAGER CIRCUIT

This invention relates to a method of demosaicing a digital raw image provided by a sensor optical device with monochrome photosites filtered by a matrix of color filters. It also relates to a corresponding computer program and to a graphics or imager circuit.

Optical system sensors, generally photodiodes, capture photons of light without color discrimination with a very broad spectrum that covers infrared to violet. To allow the acquisition of color scenes, it is therefore necessary to acquire images through color filters. Traditionally, these color filters are generally red, green, and blue; these three primary colors make it possible for all other colors visible to the human eye to be reproduced by additive synthesis. However, any other set of colors that can mathematically combine to arrive at these three primary colors is also possible, such as the four-color sets of red, green, blue, and white or cyan, magenta, yellow, and white.

Naturally, based on the three primary colors of red, green, and blue, one idea is to use three sensors to obtain a color digital image at full resolution. By this method of capture, the light is separated into three beams by a prism. Each beam is then filtered by means of a corresponding monochrome filter, respectively red, green, and blue. Then, each beam, focused on one of the three sensors, is acquired separately and recombined for RGB (Red, Green, Blue) color information for each pixel of the digital image. However, the use of an expensive and bulky optical element, like a prism, and the use of three sensors limits this method to high-end devices.

Devices for the general public, however, use a single image sensor. The solution is then to separate the colors using a matrix of color filters arranged around the monochrome photosites of the sensor and evenly distributed. The most commonly used arrangement is the repetition of a 2×2 matrix composed of two green pixels on one diagonal and one red pixel and one blue pixel on the other diagonal. This arrangement of color filters is called the Bayer pattern, named after its inventor.

The grayscale raw image that results from a capture by such an optical system is then presented in the form of a matrix of pixels, each dedicated to a single color among the predetermined colors from the color filters, such as red, green, or blue in the case of a Bayer filter. The raw image is thus comprised of multiple color planes, each corresponding to a color from the color filters. This results in a mosaic appearance in the raw image due to the differences in absorption of the different color filters depending on the color of the captured object. For example, a bright green object will be almost fully transmitted by the green filters and highly attenuated by the red and blue filters.

Many solutions have been explored to reconstruct a color digital image of the same resolution as the grayscale raw image from the latter. These reconstruction techniques are called "demosaicing", or also sometimes "dematrixing".

A family of solutions is based on a bilinear interpolation of each color plane separately from the others. Each missing color in a color plane is interpolated from the value of neighboring pixels of the same color by calculating an average, with the selection of neighboring pixels factoring into this average possibly being guided by neighboring pixels of different colors. However, the bilinear interpolation, although recently improved by techniques related to shape recognition or by Laplacian and gradient calculations, has the disadvantage of greatly reducing details and/or producing so-called "zipper" effects on the sharp transitions or false transitions in the noisy areas of the image.

Another family of more recent solutions is based on frequency or wavelet transforms. For example, the principle of demosaicing can be based on a wavelet transform of multiple color planes separately and the high frequencies of the transform can be enhanced for each color plane by high frequency transforms of other color planes by means of an iterative process. Such a solution is detailed in the article "Color plane interpolation using alternating projections", by B. K. Gunturk et al., IEEE Transactions on Image Processing, vol. 11, no. 9, September 2002. But this family of solutions is too complex to implement and is therefore reserved for high-end devices. Simplified versions of these solutions can be considered in devices intended for the general public, but at the cost of degraded quality.

Finally, a family of promising solutions attempts to first reconstruct a luminance image and chrominance images directly from the raw image, without first separating the color planes, to then obtain a color digital image of the same resolution as the raw image from which this luminance image and these chrominance images were taken. It takes advantage of the observation that, generally, in a frequency representation of the raw image obtained by Fourier transform, the luminance and chrominance information are fairly well separated. The chrominance spectrum is centered on the edges and corners of the transform, while the luminance spectrum is centered on this transform. The invention relates more specifically to a method of demosaicing of this type.

Such a method is described, for example, in the article "Frequency-domain methods for demosaïcking of Bayer-sampled color images" by E. Dubois, IEEE Signal Processing Letters, vol. 12, no. 12, December 2005. By this method, the reconstruction of the luminance image and of the chrominance images is performed without separating the raw image into color planes. However, is requires a general filtering of the raw image, first using a low-pass filtering to isolate the luminance information and then using a high-pass filtering to isolate the chrominance information.

This method has the advantage of being linear and therefore introduced in the form of a convolution filter. Its drawback, however, is that there is an unresolved luminance/chrominance spectral overlap. Depending on the cutoff frequency of the filtering, it therefore tends to produce grid effects (due to the inclusion of chrominance frequencies in the luminance signal) or, on the contrary, a soft image with numerous false colors (in the event that the luminance is too filtered). In addition, the filters that are used must be large, and the filtering affects the entire raw image, without being able to adjust to the specific frequencies of the different areas of the image.

It may therefore be desirable to provide a method of demosaicing that can resolve at least some of the above problems and constraints.

The invention therefore relates to a method of demosaicing a digital raw image by a sensor optical device with monochrome photosites filtered by a matrix of color filters, the raw image being in the form of a matrix of pixels, each dedicated to a single color among several predetermined colors from the color filters, comprising a step for obtaining a color digital image of the same resolution as the raw image and in which each pixel has multiple color components and results from corresponding pixels in a luminance image and in chrominance images reconstructed from the raw image, further comprising the following steps:

transformation of the raw image by applying local convolution kernels to its pixels, taking into account neighboring pixels of different colors, to obtain an image of low frequency coefficients using a low frequency local kernel and images of high frequency coefficients using high frequency local kernels, reconstruction of the luminance image using at least the image of low frequency coefficients, and reconstruction of the chrominance images using at least the images of high frequency coefficients.

Therefore, a method according to the invention makes it possible to obtain a color image resulting from a luminance image and from chrominance images reconstructed from a raw image of the same resolution, by a transformation using local convolution kernels that make it possible to adjust to the specific local frequencies of the raw image. While avoiding the disadvantages related to methods of processing that separate the color planes, it improves upon traditional approaches of direct and general filtering of the raw image.

Optionally, the reconstruction of the luminance image may comprise the following steps:

obtainment of high frequency luminance images by filtering images of high frequency coefficients, inverse transformation of the image of low frequency coefficients and of high frequency luminance images obtained by applying local convolution kernels to their coefficients, and then reconstruction of the luminance image by combining, especially adding, the inverse transform of the image of low frequency coefficients with the inverse transforms of the obtained high frequency luminance images.

Also optionally, the filtering of each image of high frequency coefficients comprises the following steps:

prior demodulation of the image of high frequency coefficients, low-pass filtering of the demodulated image of high frequency coefficients, and remodulation of the demodulated and low-pass filtered image of high frequency coefficients, and Also optionally, each image of high frequency coefficients that is demodulated, low-pass filtered, and then remodulated is subtracted from the corresponding image of high frequency coefficients prior to filtering to provide the corresponding high frequency luminance image.

Also optionally, a method of demosaicing according to the invention may further comprise at least one of the following two steps:

improved sharpness, such as by increasing the contrast, of high frequency luminance images by filtering, and color saturation and/or correction processing applied to chrominance images.

Also optionally, the common size of local convolution kernels corresponds to the size of a basic periodic pattern in the matrix of color filters.

Also optionally, the matrix of color filters used is a Bayer matrix, and the local convolution kernels are four-pixel square matrices.

Also optionally, the local kernels are Haar wavelets comprising one low frequency local kernel and three high frequency local kernels forming a basis for projection.

Also optionally, the prior demodulation of each image of high frequency coefficients consists in an inversion of every other row and/or every other column of this image of high frequency coefficients.

This especially simple demodulation can be implemented particularly when the local convolution kernels are Haar wavelets.

Also optionally, the reconstruction of the chrominance images may comprise the following steps:

obtainment of high frequency chrominance images by filtering images of high frequency coefficients, obtainment of a first chrominance image from one of the obtained high frequency chrominance images, obtainment of a second chrominance image by subtracting two of the obtained high frequency chrominance images, called subtraction images, after reciprocally clipping these two subtracting images pixel by pixel consisting of:

correcting the first subtraction image so that each of its coefficients is clipped, in terms of absolute value, by the value of the corresponding coefficient in the second subtraction image, and correcting the second subtraction image so that each of its coefficients is clipped, in terms of absolute value, by the value of the corresponding coefficient in the first subtraction image.

The invention also relates to a computer program that can be downloaded from a communication network and/or saved on a computer-readable medium and/or executed by a processor, comprising instructions for executing the steps of a method of demosaicing such as defined above, when said program is executed on a computer.

Finally, the invention also relates to a graphics or imager circuit having monochrome photosites filtered by a matrix of color filters, comprising a processor programmed to execute a method of demosaicing such as defined above.

Figure 2:
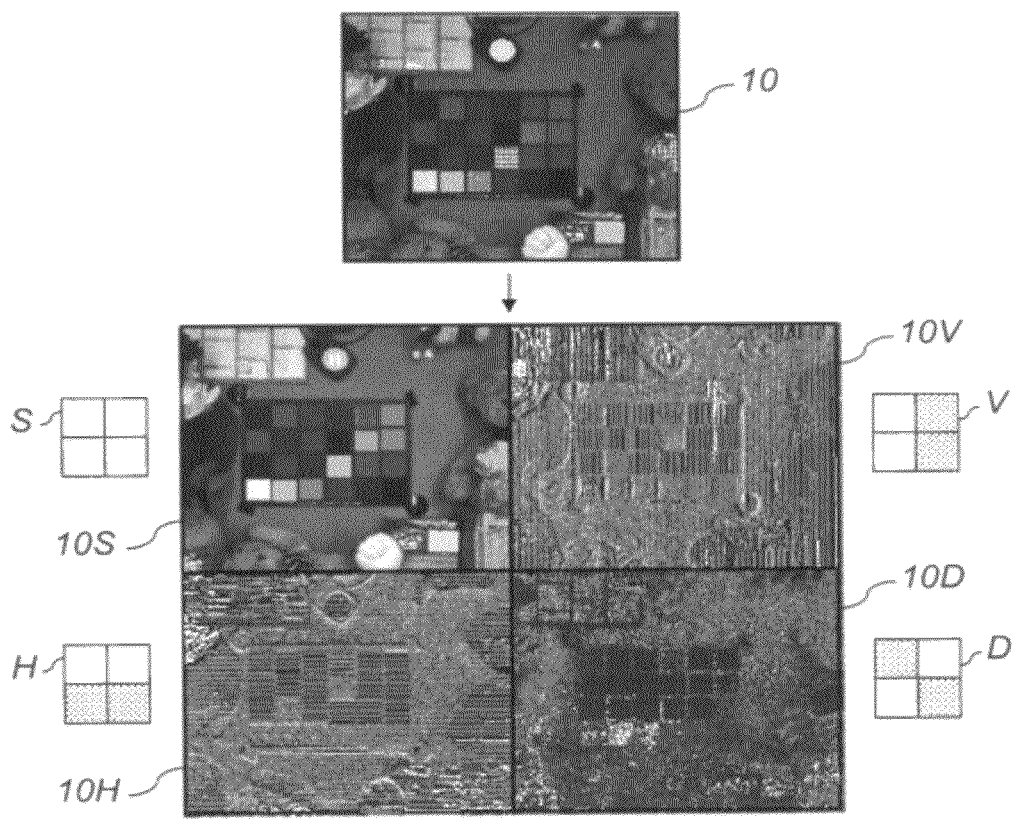
Figure 3:
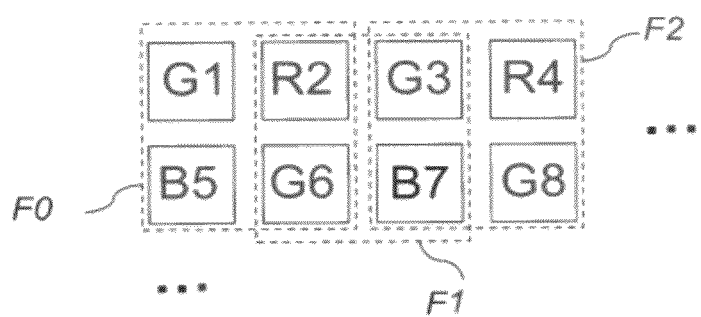
Figure 4:
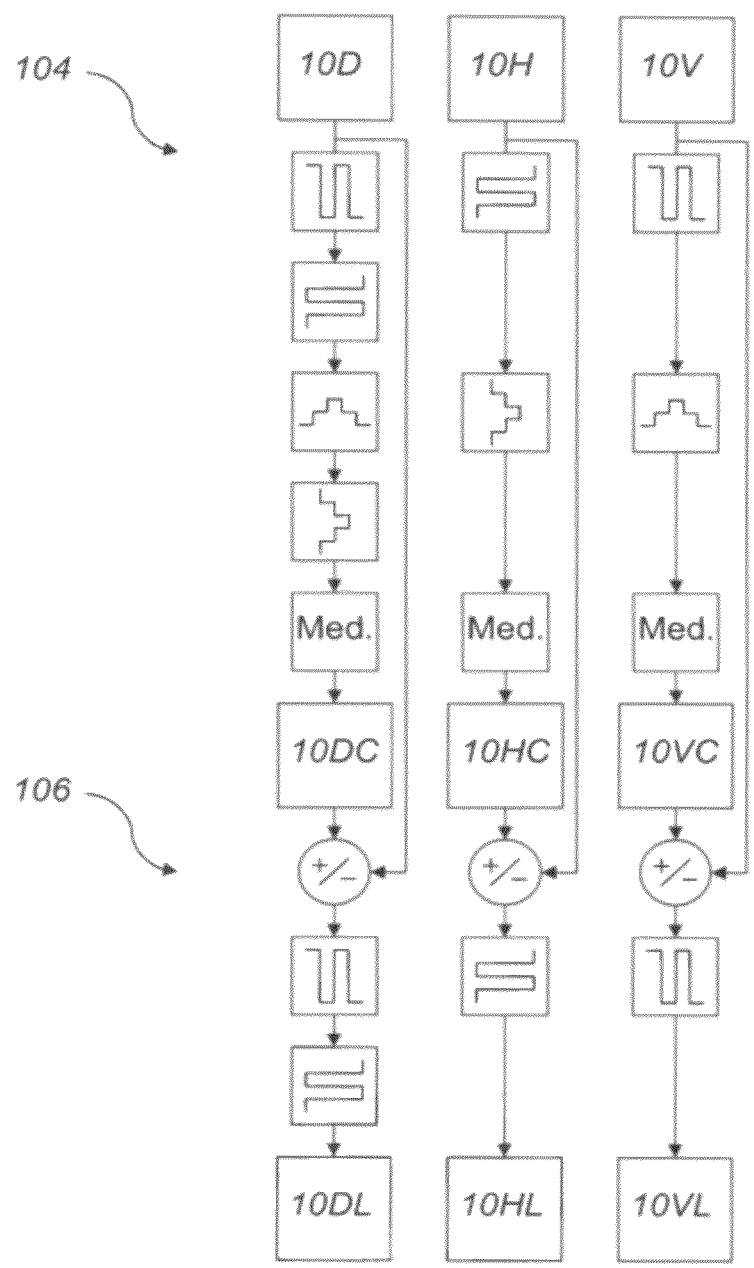
Figure 5:
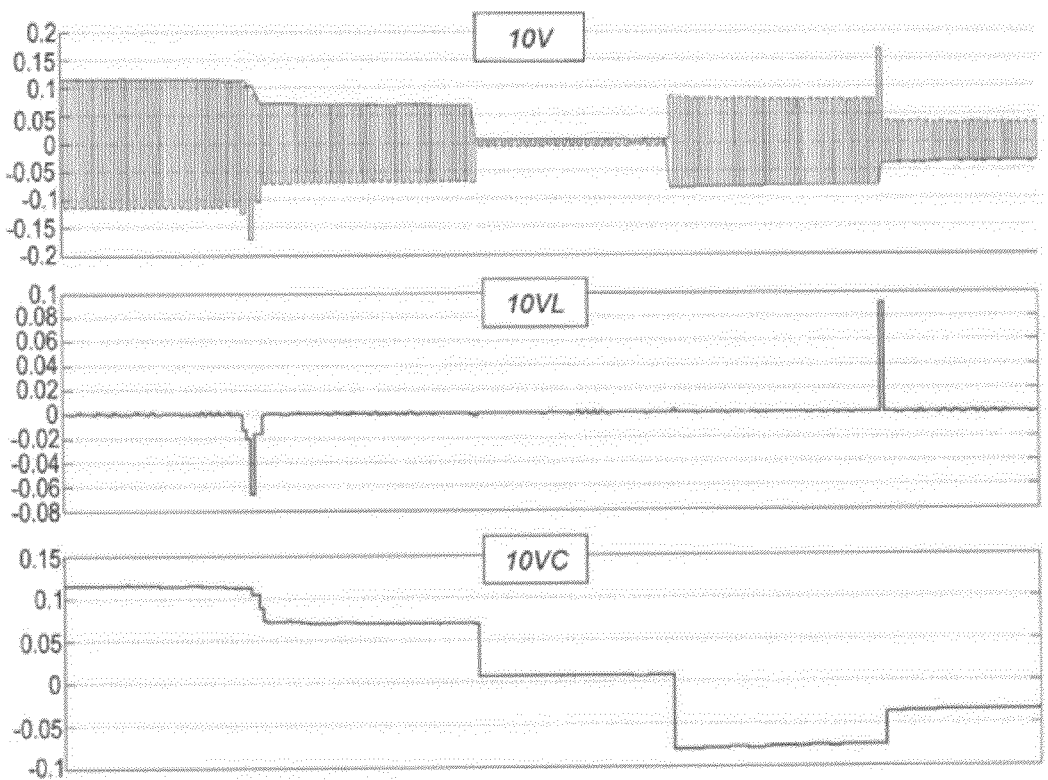
Figure 6:
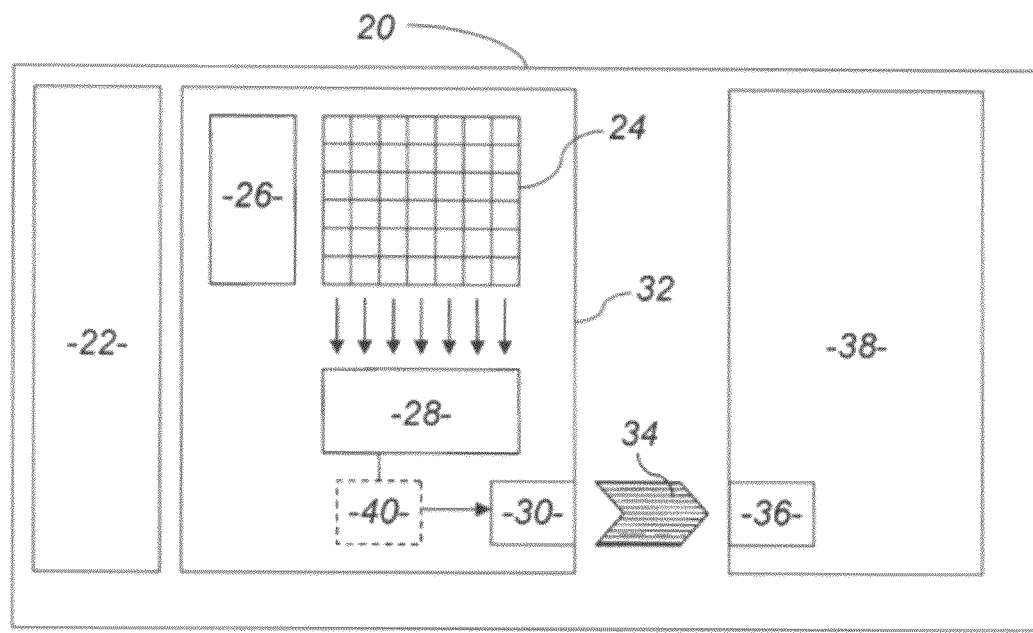

The invention will be better understood using the following description, given purely as reference and referring to the accompanying drawings, in which:

FIG. 1 schematically shows the successive steps of a method of demosaicing a raw image according to an embodiment of the invention, FIG. 2 illustrates the result of a transformation step of the raw image of the method in FIG. 1, FIG. 3 illustrates a detail of an effect of the transformation step of the method in FIG. 1 on the raw image, FIG. 4 schematically shows the detail of a filtering step involving images of high frequency coefficients in the method in FIG. 1, FIG. 5 illustrates an example result of the filtering step in FIG. 4, FIG. 6 schematically shows the general structure of an image sensor comprising a graphics or imager circuit designed for an implementation of the invention.

The method of demosaicing illustrated in FIG. 1 comprises a preliminary step 100 of preprocessing a grayscale digital raw image 10 provided by a single sensor optical system having monochrome photosites filtered by a matrix of color filters. The raw image 10 is then presented in the form of a matrix of pixels, each dedicated to a single color among several predetermined colors from the color filters. In the example in FIG. 1, the raw image 10 is symbolized by a Bayer RGB pattern that is reproduced on the entire image. Therefore, each 2×2 matrix of pixels extracted from the raw image comprises two filtered green pixels (denoted as "G") on one diagonal and one red filtered pixel and one blue filtered pixel (denoted as "R" and "B", respectively) on the other diagonal.

The preprocessing step 100 involves performing:

an offset correction to reset the level of black in the pixels provided by the sensor, and a color-balancing operation consisting of multiplying the value of each pixel in a color plane given by the raw image 10 by a predetermined constant coefficient such that the black, gray, and white areas of the image produce the same value, regardless of the color of the filter associated with the pixel.

This preprocessing step is followed by a step 102 to transform the raw image 10 by applying local convolution kernels to its pixels. The chosen convolution kernels are called "local" in the sense that they are of a small dimension with respect to the dimensions of the raw image. These are specifically square matrices of a few pixels wide, 2 to 5 maximum.

In a preferred embodiment of the invention, these local kernels are the same size as the basic periodic pattern in the matrix of color filters. Therefore, in the case of a matrix of Bayer pattern filters, it is preferably to choose 2×2 convolution kernels, such as the following four convolution kernels of the two-dimensional Haar transform:

$$S = \frac{1}{4}\begin{bmatrix} +1 & +1 \\ +1 & +1 \end{bmatrix}, V = \frac{1}{4}\begin{bmatrix} +1 & -1 \\ +1 & -1 \end{bmatrix}, H = \frac{1}{4}\begin{bmatrix} +1 & +1 \\ -1 & -1 \end{bmatrix}$$

and $$D = \frac{1}{4}\begin{bmatrix} +1 & -1 \\ -1 & +1 \end{bmatrix}.$$

These four convolution kernels form a basis for the local projection of 2×2 sub-matrices of pixels in the raw image 10, in which S is the low frequency local kernel and V, H, and D are high frequency local kernels. The convolution of the raw image 10 by one of these local kernels is done in a manner known "per se" by "dragging" the kernel to the raw image 10, pixel by pixel: for all of the 2×2 pixel groups in the raw image 10, the convolution will produce a single coefficient equal to the sum of these pixels, each weighted by the corresponding coefficient in the kernel. This results in the two-dimensional Haar wavelet transform of the raw image 10 without having separated the raw image into color planes.

More specifically and as illustrated in FIG. 2, from the raw image 10, each convolution product using S, V, H, or D produces a new corresponding image 10S, 10V, 10H, and 10D of the same resolution as the raw image 10. In the case of 2×2 convolution kernels, however, the images 10S, 10V, 10H, and 10D are offset by a half pixel to the right and down with respect to the raw image 10.

A two-dimensional Haar wavelet transform of a monochrome image would provide an image of local averages using S, an image of vertical transitions using V, an image of horizontal transitions using H, and an image of diagonal transitions using D.

Applied to the Bayer raw image 10, the kernel S still applies a local low-pass filter so as to provide an image 10S of low frequency coefficients comprising the luminance information Y in the form of Y=0.25R+0.5G+0.25B, where R, G, and B are the contributions of the red, green, and blue components, respectively, of the raw image 10. More specifically, the image of low frequency coefficients 10S is a luminance image that does not contain all the luminance information from the raw image 10: it contains local average luminance information, but not the vertical, horizontal, and diagonal luminance information.

Applied to the Bayer raw image 10, the kernels V, H, and D always apply a local high-pass filter so as to provide images 10V, 10H, and 10D of high frequency coefficients comprising the vertical, horizontal, and diagonal luminance information Y above, but overlapping parasitic chrominance information. More specifically, the images of high frequency coefficients 10V, 10H and 10D are images that contain high frequency luminance information Y and the chrominance information associated with the raw image 10.

It is therefore appropriate, at this stage of the method, to separate the luminance information Y from the associated chrominance information in the images of high frequency coefficients 10V, 10H, and 10D. To do this, the step 102 is followed by a step 104 to filter the images of high frequency coefficients 10V, 10H, and 10D using specific means of filtering FV, FH, and FD. This step 104 will be detailed with reference to FIG. 4.

Three images 10VC, 10HC, and 10DC, respectively, are provided as a result of the filtering means FV, FH, and FD. As will be detailed below, these three images contain chrominance information in addition to the luminance information Y. They will therefore qualify as high frequency chrominance images.

During a following step 106, the three high frequency chrominance images 10VC, 10HC, and 10DC are subtracted from the images of high frequency coefficients 10V, 10H, and 10D before filtering. The three resulting images 10VL, 10HL, and 10DL are high frequency luminance images containing the vertical transition, horizontal transition, and diagonal transition information, respectively, of the luminance Y in the raw image 10. Therefore, the four images 10S, 10VL, 10HL, and 10DL contain all of the information needed to fully reconstruct a luminance image, according to the luminance Y defined above.

Optionally, processing to improve sharpness, specifically by increasing contrast through the application of a filter, can be applied to the high frequency luminance images 10VL, 10HL, and 10DL during a step 108. The filter used is designed to reduce or increase the value of the coefficients of images 10VL, 10HL, and 10DL, potentially based on their values and those of their neighbors. In its simpler version, the application of a filter may consist of applying a gain.

Then, during a step 110, an inverse transformation to the one performed in step 102 is applied to the four images 10S, 10VL, 10HL, and 10DL using inverse convolution kernels adapted to those applied in step 102. In the specific illustrated case of a Haar inverse transform, the four kernels can be:

$$Si = \frac{1}{4}\begin{bmatrix} +1 & +1 \\ +1 & +1 \end{bmatrix}, Vi = \frac{1}{4}\begin{bmatrix} +1 & -1 \\ +1 & -1 \end{bmatrix}, Hi = \frac{1}{4}\begin{bmatrix} +1 & +1 \\ -1 & -1 \end{bmatrix}$$

and $$Di = \frac{1}{4}\begin{bmatrix} +1 & -1 \\ -1 & +1 \end{bmatrix}.$$

The images that result from these convolutions are then offset by a half pixel toward the right and down with respect to the images 10S, 10VL, 10HL, and 10DL. These resulting images are then combined during a step 112, or more specifically simply added, to reconstruct a luminance image 10L offset by one pixel toward the right and down with respect to the raw image 10, but with the same resolution as it.

In a variant, in a very simplified embodiment of steps 110 and 112, the four inverse convolution kernels could be: Si'=[+1], Vi'=[−1], Hi'=[−1] and Di'=[+1], which then performs the following operation pixel by pixel:

$$10L = 10S + 10VL + 10HL + 10DL.$$

In this variant, the reconstructed luminance image 10L is offset by a half pixel toward the right and down with respect to the raw image 10. This variant simplifies the steps 110 and 112, but artifacts that are potentially introduced when obtaining images 10S, 10VL, 10HL, and 10DL are then not reduced.

The three high frequency chrominance images 10VC, 10HC, and 10DC, resulting from the means of filtering FV, FH, and FD, respectively, in step 104, also undergo processing during a step 114, involving the images 10VC and 10HC, and an optional step 116.

More specifically, as will be explained in detail with reference to FIGS. 3 and 4, the high frequency chrominance image 10DC is preserved as the first chrominance image 10C1, offset by a half pixel toward the right and down with respect to the raw image 10, but with the same resolution as it.

The high frequency chrominance images 10VC and 10HC are subtracted pixel by pixel during step 114 to form a second chrominance image 10C2, offset by a half pixel toward the right and down with respect to the raw image 10, but with the same resolution as it.

Optionally, a traditional color saturation and/or correction processing may be applied to the two chrominance images 10C1 and 10C2 during the step 116.

Following the steps 112 and 116, during a step 118 performing a linear combination CL of images 10L, 10C1, and 10C2, an RGB color digital image 12 is obtained. In this color digital image 12 of the same resolution as the raw image 10, each red, green, or blue component of each pixel results from corresponding pixels in the luminance image 10L and in the chrominance images 10C1 and 10C2.

In practice and in the example embodiment above (two-dimensional Haar transformations), if during the step 110 the inverse convolution kernels Si, Vi, Hi, and Di are chosen, this results in an offset of a half pixel toward the right and down in the luminance image 10L with respect to the chrominance images 10C1 and 10C2. In this case, it is possible to readjust the images 10C1 and 10C2 on the image 10L by applying an average filter to them, using the convolution kernel S for example. This additional filtering can be performed during the step 116. Alternatively, it may be advantageous to use the high frequency luminance images 10VL, 10HL, and 10DL to guide an adjustment other than a simple average filter, such as a bilinear interpolation parallel to the local luminance transitions when the pixels in images 10VL, 10HL, and 10DL have a high amplitude in terms of absolute value, compared with a predetermined threshold criterion.

However, if during the step 110 the inverse convolution kernels Si', Vi', Hi', and Di' are chosen, no adjustment to the chrominance images 10C1 and 10C2 are necessary.

To elaborate on the filtering step 104, it is necessary to first study the effect of the transformation step 102 on the raw image 10, particularly with regard to the convolution of the raw image 10 by each of the high frequency local kernels V, H, and D. Our hypothesis is that each coefficient of the transformed images 10V, 10H, and 10D represents a mixture of pure luminance transition information contributing to the reconstruction of image 10L and pure chrominance information contributing to the reconstruction of images 10C1 and 10C2.

From any 2×2 matrix of neighboring pixels $$\begin{bmatrix} G1 & R2 \\ B3 & G4 \end{bmatrix}$$

extracted from the raw image 10, the application of the kernel V provides a coefficient $a_V$=G1−R2+B3−G4 that can then be expressed as $a_V$=ΔV+($b_V$B−$r_V$R), where ΔV expresses a local vertical transition of the luminance Y, as defined above, and ($b_V$B−$r_V$R)=$α_V$C2 expresses a local contribution to the chrominance C2 of the image 10C2.

The application of the kernel H provides a coefficient $a_H$=G1+R2−B3−G4 that can also be expressed as $a_H$=ΔH−($b_H$B−$r_H$R), where ΔH expresses a local horizontal transition of the luminance Y, as defined above, and −($b_H$B−$r_H$R)=−$α_H$C2 expresses a local contribution to the chrominance C2 in the image 10C2. Note that V and H make a comparable contribution to the chrominance C2, of the sign.

Finally, the application of the kernel D provides a coefficient $a_D$=G1−R2−B3+G4 that can also be expressed as $a_D$=ΔD+($2g_D$G−$b_D$B−$r_D$R), where ΔD expresses a local diagonal transition of the luminance Y, as defined above, and ($2g_D$G−$b_D$B−$r_D$R)=$α_D$C1 expresses a local contribution to the chrominance C1 in the image 10C1.

More specifically, as illustrated in FIG. 3 for the local application of the convolution kernel V on the Bayer raw image 10, a first coefficient V0 is obtained for a first convolution window F0:

$$V0 = G1 - G6 + B5 - R2 = \Delta V0 + Ca0.$$

A second coefficient V1 is obtained, by dragging a column to the right, for a second convolution window F1:

$$V1 = G6 - G3 - (B7 - R2) = \Delta V1 Ca1.$$

A third coefficient V2 is obtained, by dragging a column to the right, for a third convolution window F2:

$$V2 = G3 - G8 + B7 - R4 = \Delta V2 + Ca2.$$

By observing the sign of the contributions of chrominance Cai, the Vi coefficients represent the luminance vertical transition information superimposed with chrominance information with the opposite sign for each coefficient. In other words, the coefficients Vi represent the luminance vertical transition information of the luminance image 10L superimposed with chrominance information modulated by the spatial frequency of sampling.

It can easily be shown that this modulation is horizontal for the image 10V (the sign of the chrominance information is opposite between two columns but remains the same within a single column), vertical for the image 10H (the sign of the chrominance information is opposite between two rows but remains the same within a single row), and horizontal and vertical for the image 10D (the sign of the chrominance information is opposite between two rows and between two columns).

Therefore, in the image 10V and in the images 10H and 10D, the chrominance information affects the envelope of the signal, and the transitions appear as isolated peaks or common mode variations. Therefore, the separation of chrominance and luminance information in the images 10V, 10H, and 10D corresponds to an adapted demodulation and filtering of the signal. Any traditional demodulation method may be used, but in the case of a transformation of a Bayer image using two-dimensional Haar convolution kernels, the demodulation can be quite uncomplicated and require little memory. This will now be detailed with reference to FIG. 4, returning to the filtering step 104, as applied in the specific case of the Bayer raw image 10 provided in the step 100 and of the Haar transform applied in the step 102.

As illustrated in this figure and considering the effect of the transformation step 102 studied above, the filtering FV of the image of high frequency coefficients 10V comprises the following steps:

inversion of every other column in the image 10V (demodulation), low-pass filtering of the resulting image, such as by using a one-dimensional convolution kernel $$\frac{1}{4}[1 \quad 2 \quad 1]$$

applied along the rows, and the possible application of a median filter to each pixel in the resulting filtered image, the median filter covering a neighborhood around this pixel forming a horizontal area of 3 pixels or a square area of 3×3 pixels, to obtain the image 10VC.

The image 10VL then results from executing the following steps:

subtraction of the image 10VC from the image 10V, and inversion of every other column in the resulting image (remodulation).

An example of the processing above on a row of the image 10V is illustrated by the diagram in FIG. 5, in which the signal representing the image 10V is modulated, while the signal representing the image 10VC comprises its filtered envelope and the signal representing the image 10VL takes only the isolated peaks representative of vertical transitions.

As also illustrated in FIG. 4 and considering the effect of the transformation step 102 studied above, the filtering FH of the image of high frequency coefficients 10H comprises the following steps:

inversion of every other row in the image 10H (demodulation), low-pass filtering of the resulting image, such as by using a one-dimensional convolution kernel $$\frac{1}{4}\begin{bmatrix}1\\2\\1\end{bmatrix}$$

applied along the columns, and the possible application of a median filter to each pixel in the resulting filtered image, the median filter covering a neighborhood around this pixel forming a vertical area of 3 pixels or a square area of 3×3 pixels, to obtain the image 10HC.

The image 10HL then results from executing the following steps:

subtraction of the image 10HC from the image 10H, and inversion of every other row in the resulting image (remodulation).

As also illustrated in FIG. 4 and considering the effect of the transformation step 102 studied above, the filtering FD of the image of high frequency coefficients 10D comprises the following steps:

inversion of every other column in the image 10D and then every other row (demodulation), low-pass filtering of the resulting image, such as by using the one-dimensional convolution kernel applied $$\frac{1}{4}[1 \quad 2 \quad 1]$$

along the rows and then the one-dimensional convolution kernel $$\frac{1}{4}\begin{bmatrix}1\\2\\1\end{bmatrix}$$

applied along the columns, or perhaps using the two-dimensional convolution kernel $$\frac{1}{16}\begin{bmatrix}-1 & 2 & -1\\2 & 12 & 2\\-1 & 2 & -1\end{bmatrix},$$

and the possible application of a median filter to each pixel in the resulting filtered image, the median filter covering a neighborhood around this pixel forming a square area of 3×3 pixels or a selection of 5 pixels in "×" or "+" form, to obtain the image 10DC.

The image 10DL then results from executing the following steps:

subtraction of the image 10DC from the image 10D, and inversion of every other column in the resulting and then every other row (remodulation).

The filtering kernels mentioned above for performing the filtering FV, FH, and FD are provided purely for illustrative purposes. Other filters may be more appropriate from the standpoint that they can cut any horizontal oscillation of the image 10V, any vertical oscillation of the image 10H, and any horizontal and vertical oscillation of the image 10D.

The effect of the step 104 on the images 10V, 10H, and 10D is to provide high frequency chrominance images 10VC, 10HC, and 10DC that have been cleared of their luminance information and whose coefficients contribute to the chrominance information of the original raw image 10.

More specifically, by using the notations from above, the coefficients of the image 10VC make a contribution like $\alpha_V C2$, the coefficients of the image 10HC make a contribution like $-\alpha_H C2$, and the coefficients of the image 10DC make a contribution like $\alpha_D C1$. This is why the first chrominance image 10C1 is obtained by considering only the image 10DC, while the second chrominance image 10C2 is obtained by considering both images 10VC and 10HC, subtracting one from the other during the step 114. This then shows that this subtraction operation has an additional effect of reducing the so-called "green imbalance" error (different response from two neighboring green pixels), which is a common error for small imager circuits.

Another residual problem may persist in the second chrominance image 10C2 despite the subtraction operation. These are local artifacts of accidental coloration in areas with very high spatial frequency. To reduce or eliminate these local artifacts, before subtracting images 10VC and 10HC from one another, it is possible during the step 114 to perform the following prior processing:

the image 10VC is corrected so that each of its coefficients is clipped, in terms of absolute value, by the value of the corresponding coefficient in the image 10HC, and the image 10HC is corrected so that each of its coefficients is clipped, in terms of absolute value, by the value of the corresponding coefficient in the image 10VC.

The subtraction is then done after this double clipping, which then forces the two images 10VC and 10HC to make the same contribution to the chrominance information, of the sign.

Note that, for each pixel in the image 10VC (or 10HC, respectively), this upfront double-clipping processing replaces its absolute value by the minimum of its absolute value and that of the corresponding pixel in the image 10HC (or 10VC, respectively). This is why the accidental coloration areas are neutralized by this minimization operation.

Finally, given the transformation step 102 studied above, and also the steps 104 and 114, it happens that, in the example illustrated, the luminance image 10L has luminance information in the combination 2G+R+B, the first chrominance image 10C1, chrominance information in the combination 2G−R−B, and the second chrominance image 10C2, chrominance information in the combination B−R. The result is that the linear combination of these images performed in the step 118 for obtaining the color image 12, comprised of three red, green, and blue components, denoted as 12R, 12G, and 12B, can be defined as follows:

$$12R = \frac{1}{2}\left[\frac{1}{2}(10L - 10C1) - 10C2\right],$$

$$12G = \frac{1}{4}[10L + 10C1],$$

$$12B = \frac{1}{2}\left[\frac{1}{2}(10L - 10C1) + 10C2\right].$$

The method of filtering with simplified demodulation, as described above, is very simple to implement. This makes it particularly relevant to the constraints of the reading chain of a general public imager circuit.

In fact, the standard reading mode for such an imager circuit requires the transmission of each image row by row. The rows of the image are then processed on the fly by a signal processor. For cost reasons, this processor can keep only a few consecutive rows of the image in memory (usually up to five rows). The signal processing algorithms installed on this processor therefore cannot simultaneously access the values of pixels more than five rows away. The method of filtering with demodulation described above is therefore less effective than more complex methods of demodulation/filtering, but it is designed to advantageously meet this constraint.

The complete method of demosaicing described with reference to FIGS. 1 and 4 can be implemented by an image sensor, such as a CMOS sensor whose standard optical module is shown in FIG. 6.

In this figure, a sensor optical module 20 comprises an optical block 22 and a matrix 24 of sensitive elements, photodiodes that, using means of electronic reading that are not shown, form pixels of an image to be captured. On this matrix 24, there is a matrix of color filters, such as a Bayer pattern.

The matrix of pixels 24 is associated with a sequencing device 26 and an analog/digital conversion device 28, making it possible to acquire a digital raw image matrix of pixels. The matrix of pixels 24, the sequencing device 26, and the digital/analog conversion device 28, with an interface 30 to transmit the acquired digital images, form an electronic circuit 32, generally called an "imager circuit" or "focal plane" of the CMOS sensor.

The interface 30 for the imager circuit 32 is also usually connected by a physical electronic link 34 to the interface 36 for receiving digital images from a graphics coprocessor circuit 38 that makes it possible to implement algorithms for processing the digital images that are acquired.

The graphics coprocessor circuit 38, or the imager circuit 32 when there is an optional processor 40 between the analog/digital conversion device 28 and the interface 30, can be programmed to execute the method of demosaicing described above, particularly the steps 100 to 118 described above.

Finally, note that the invention is not limited to the considered embodiment.

Specifically, patterns other than the Bayer pattern can be used for the formation of the raw image 10. In this case, the local convolution kernels that are used for the transformation 102 of the raw image must be adjusted. There are many known families of transforms.

Depending on the color filters that are used and the transformation applied to the step 102, the study of the effects of this transformation on the raw image 10 also leads to a known manner to adjust the parameters of the filtering in the step 104 and the combinations of steps 106, 112, 114, and 118.

More generally, as is known to those skilled in the art, there are various modifications that can be made to the embodiment described above, with respect to the teaching that has been disclosed. In the following claims, the terms used should not be interpreted as limiting the claims to the embodiment presented in this description, but should be interpreted to include all of the equivalents that the claims intend to cover by their formulation and whose projection is within reach of those skilled in the art by applying their general knowledge to the teaching that has just been disclosed.

The invention claimed is:

1. A method of demosaicing a digital raw image provided by a sensor optical device with monochrome photosites filtered by a matrix of color filters, the raw image being in the form of a matrix of pixels, each dedicated to a single color among several predetermined colors from the color filters, the digital raw image comprising multiple color planes, each of the multiple color planes including each pixel of the digital raw image that is dedicated to a specified color filter of the color filters, comprising:
   reconstructing a luminance image from the digital raw image, without prior separation of the multiple color planes;
   reconstructing chrominance images from the digital raw image, without prior separation of the multiple color planes;
   obtaining a color digital image of the same resolution as the digital raw image and in which each pixel has multiple color components and results from corresponding pixels of said luminance image and of said chrominance images by:
   obtaining an image of low frequency coefficients using a low frequency local kernel, of a plurality of local convolution kernels, applied to each of the pixels of the digital raw image without prior separation of the multiple color planes, wherein the low frequency local kernel applies convolutions to neighboring pixels of different ones of the multiple color planes in the digital raw image;
   obtaining images of high frequency coefficients using high frequency local kernels of the plurality of local convolution kernels, applied to each of the pixels of the digital raw image without prior separation of the multiple color planes, wherein the high frequency local kernels apply convolutions to the neighboring pixels of the different ones of the multiple color planes in the digital raw image;
   reconstructing the luminance image based on obtaining the image of low frequency coefficients; and
   reconstructing the chrominance images based on obtaining the images of high frequency coefficients.

2. The method of demosaicing according to claim 1, wherein reconstructing the luminance image includes obtaining high frequency luminance images by filtering the images of the high frequency coefficients, inverse transformation of the image of low frequency coefficients and the high frequency luminance images by applying corresponding ones of the plurality of local convolution kernels to the high frequency coefficients and the low frequency coefficients, and reconstructing the luminance image by combining an inverse transform of the image of the low frequency coefficients with inverse transforms of the high frequency luminance images.

3. The method of demosaicing according to claim 2, in which the filtering of the images of high frequency coefficients comprises the following steps:
   prior demodulation of each of the images of high frequency coefficients;
   low-pass filtering of each of demodulated images of high frequency coefficients; and
   remodulating each of the demodulated and low-pass filtered images of high frequency coefficients.

4. The method of demosaicing according to claim 3, in which each of the images of high frequency coefficients that is demodulated, low-pass filtered, and then remodulated is individually subtracted from a corresponding one of the images of high frequency coefficients prior to the filtering to provide a corresponding one of the high frequency luminance images.

5. The method of demosaicing according to one of claims 2, 3, and 4, further comprising at least one of the following:
   improving sharpness by increasing the contrast of the high frequency luminance images by the filtering; and
   applying at least one of color saturation processing and color correction processing to the chrominance images.

6. The method of demosaicing according to one of claims 1 to 4, in which a size common to each of the plurality of local convolution kernels corresponds to a size of a basic periodic pattern of the matrix of color filters.

7. The method of demosaicing according to claim 6, in which the matrix of color filters is a Bayer matrix and in which each of the plurality of local convolution kernels is a four-pixel square matrix.

8. The method of demosaicing according to claim 7, in which the plurality of local convolution kernels are Haar wavelets comprising the low frequency local kernel and three high frequency local kernels forming a basis for projection.

9. The method of demosaicing according to claim 3, in which the prior demodulation of each of the images of high frequency coefficients includes at least one of an inversion of every other row and an inversion of every other column of each of the images of the high frequency coefficients.

10. The method of demosaicing according to one of claims 1, 2, 3, 4, and 9, in which the reconstruction of the chrominance images comprises the following steps:
   obtaining high frequency chrominance images by filtering the images of high frequency coefficients;
   obtaining a first chrominance image based on obtaining the high frequency chrominance images;
   obtaining a second chrominance image by subtracting two (10VC, 10HC) of the obtained high frequency chrominance images, called subtraction images, after reciprocally clipping the subtraction images pixel by pixel by correcting a first subtraction image so that each of its coefficients is clipped, in terms of absolute value, by the value of the corresponding coefficient in a second subtraction image; and
   correcting the second subtraction image so that each of its coefficients is clipped, in terms of absolute value, by the value of the corresponding coefficient in the first subtraction image.

11. At least one of an imager and a graphics circuit of an image sensor with the monochrome photosites filtered by the matrix of color filters comprising the processing circuitry that is configured to execute the method of demosaicing according to one of claims 1, 2, 3, 4, and 9.

12. The method of demosaicing according to claim 8, in which the prior demodulation of each of the images of high frequency coefficients includes at least one of an inversion of every other row and an inversion of every other column of each of the images of the high frequency coefficients.

13. A non-transitory computer-readable storage medium having computer readable program codes embodied in the computer readable storage medium for performing demosaicing of a digital raw image provided by a sensor optical device with monochrome photosites filtered by a matrix of color filters, the raw image being in the form of a matrix of pixels, each dedicated to a single color among several predetermined colors from the color filters, the digital raw image comprising multiple color planes, each of the multiple color planes including each pixel of the digital raw image that is dedicated to a specified color filter of the color filters, the computer readable program codes, when executed cause a computer to execute:
   reconstructing a luminance image from the digital raw image, without prior separation of the multiple color planes;
   reconstructing chrominance images from the digital raw image, without prior separation of the multiple color planes;
   obtaining a color digital image of the same resolution as the digital raw image and in which each pixel has multiple color components and results from corresponding pixels of said luminance image and of said chrominance images by:
   obtaining an image of low frequency coefficients using a low frequency local kernel, of a plurality of local convolution kernels, applied to each of the pixels of the digital raw image without prior separation of the multiple color planes, wherein the low frequency local kernel applies convolutions to neighboring pixels of different ones of the multiple color planes in the digital raw image;
   obtaining images of high frequency coefficients using high frequency local kernels of the plurality of local convolution kernels, applied to each of the pixels of the digital raw image without prior separation of the multiple color planes, wherein the high frequency local kernels apply convolutions to the neighboring pixels of the different ones of the multiple color planes in the digital raw image;
   reconstructing the luminance image based on obtaining the image of low frequency coefficients; and
   reconstructing the chrominance images based on obtaining the images of high frequency coefficients.

14. The non-transitory computer-readable storage medium according to claim 13, wherein reconstructing the luminance image includes obtaining high frequency luminance images by filtering the images of the high frequency coefficients, inverse transformation of the image of low frequency coefficients and the high frequency luminance images by applying corresponding ones of the plurality of local convolution kernels to the high frequency coefficients and the low frequency coefficients, and reconstructing the luminance image by combining an inverse transform of the image of the low frequency coefficients with inverse transforms of the high frequency luminance images.

15. The non-transitory computer-readable storage medium according to claim 14, in which the filtering of the images of high frequency coefficients comprises:
- prior demodulation of each of the images of high frequency coefficients;
- low-pass filtering of each of demodulated images of high frequency coefficients; and
- remodulating each of the demodulated and low-pass filtered images of high frequency coefficients.

16. The non-transitory computer-readable storage medium according to claim 15, in which each of the images of high frequency coefficients that is demodulated, low-pass filtered, and then remodulated is individually subtracted from a corresponding one of the images of high frequency coefficients prior to the filtering to provide a corresponding one of the high frequency luminance images.

17. The non-transitory computer-readable storage medium according to claim 15, in which the prior demodulation of each of the images of high frequency coefficients includes at least one of an inversion of every other row and an inversion of every other column of each of the images of the high frequency coefficients.

\* \* \* \* \*